United States Patent [19]

McKee et al.

[11] 4,421,875

[45] Dec. 20, 1983

[54] PROCESS FOR THE MANUFACTURE OF IMPACT RESISTANT THERMOPLASTIC MOLDING MATERIALS

[75] Inventors: Graham E. McKee, Weinheim; Franz Brandstetter, Neustadt; Adolf Echte, Ludwigshafen; Juergen Hambrecht, Heidelberg; Heinz-Juergen Overhoff; Edmund Priebe, both of Frankenthal; Josef Schwaab, Maikammer; Peter Siebel, Limburgerhof, all of Fed. Rep. of Germany

[73] Assignee: BASF Aktiengesellschaft, Ludwigshafen, Fed. Rep. of Germany

[21] Appl. No.: 366,697

[22] Filed: Apr. 8, 1982

[51] Int. Cl.$^3$ ............................................... C08J 3/02

[52] U.S. Cl. ................................. 523/335; 524/458; 524/501; 524/777; 525/206; 525/222; 525/231; 525/244; 525/261; 525/263; 525/315

[58] Field of Search ............... 525/222, 206, 231, 261, 525/263, 315, 244; 523/335; 524/777, 458, 501

[56] References Cited

U.S. PATENT DOCUMENTS

| | | | |
|---|---|---|---|
| 3,576,910 | 4/1971 | Jastrezebski | 525/71 |
| 3,607,807 | 9/1971 | Huddleston, Jr. | 524/777 |
| 3,825,621 | 7/1974 | Ford | 525/315 |

Primary Examiner—J. Ziegler
Attorney, Agent, or Firm—Joseph D. Michaels

[57] ABSTRACT

The invention relates to a process for the manufacture of impact resistant thermoplastic molding materials wherein potassium salts of saturated or unsaturated fatty acids with 10 to 30 carbon atoms are used as emulsifier.

5 Claims, No Drawings

PROCESS FOR THE MANUFACTURE OF IMPACT RESISTANT THERMOPLASTIC MOLDING MATERIALS

BACKGROUND OF THE INVENTION

1. Field of the Invention

This invention relates to a process for the manufacture of impact resistant thermoplastic molding materials. More particularly this invention relates to a process of making acrylic ester-modified styrene-acrylonitrile terpolymer which are modified to be impact resistant, ASA, and acrylonitrile-butadiene-styrene, ABS, polymers by graft polymerization using an agglomerated rubber latex which was produced in emulsion.

2. Description of the Prior Art

The following references are part of the current state of the art: (1) German Application No. 24 27 960, (2) German Application No. 12 47 665, (3) German Application No. 12 69 360, (4) German Application No. 13 00 241 and (5) German Application No. 12 92 850.

The rubber latices which are produced by the commonly used homo- or mixed polymerization of, for instance, butadiene in emulsion have particle diameters in the order of magnitude of approximately 0.02 to 0.15 microns. ABS and ASA polymers which are produced with such rubbers show a relatively low impact resistance. It is known that ABS polymers with more favorably properties can be produced if rubber latices with larger particles are used for the grafting polymerization.

References (2) and (3) relate to butadiene polymer latices having particle sizes of 0.15 to 0.6 microns and/or a latex particle diameter of more than 0.3 microns. In these references, statements are also made as to how such large particle latices are obtained, for instance, by polymerization in concentrated emulsion, by using smaller amounts of emulsifier, or by staggering the addition of emulsifier. These direct polymerization processes for the manufacture of coarse particle latices, however, have the drawback of relatively long polymerization times: Generally it takes several days for achieving essentially complete reaction.

Another direct method for the manufacture of coarse particle latices is recommended in reference (3). According to this method, additional monomers are to be added during the polymerization. This process also requires long polymerization times.

An indirect method for the manufacture of coarse particle latices consists of adding electrolytes to a fine particle rubber latex thereby enlarging the particles, compare reference (5). In accordance with this method, the agglomeration takes place during the grafting process. This method has two drawbacks: because of the danger of coagulation, larger quantities of emulsifier must be added which may result in disturbances during the subsequent precipitation. In addition to this, the added ions partially remain in the product and can result in corrosion during processing and can further cause a discoloration of the product.

In addition to this, a number of physical methods for agglomeration, for instance, freezing or shear agglomeration, as well as additional chemical methods, for instance, the agglomeration with polymer dispersions based on polyvinyl ethers are cited as the current state of the art in reference (1).

In reference (1) a process for the manufacture of coarse particle suspension is described wherein the agglomeration is implemented by adding an acrylate polymer dispersion to the rubber latex.

The drawback of this process is that a relatively large amount of coagulate is incurred after the graft polymerization.

A purpose of this invention was to develop a process according to which the particles of a rubber latex can be partially or entirely agglomerated in a simple and industrially economically implementable manner such that this process can be used to manufacture ABS and/or ASA polymers with a balanced property combination of impact resistance, flowability and surface gloss and the amount of coagulate during the manufacture of the dispersion being reduced.

This purpose is met by a process for the manufacture of impact resistant thermoplastic molding materials comprising I. polymerization of at least one monomer selected from the group consisting of
 (a) conjugated diolefins having 4 carbon atoms to 5 carbon atoms,
 (b) acrylates of alcohols having 1 carbon atom to 8 carbon atoms,
 (c) comonomers of (a) or (b) and
 (d) monomers having a cross-linking action in the presence of water
and in the presence of
 (e) at least one emulsifier and
 (f) at least one initiator to produce a rubber latex having an average particle size ($d_{50}$-value of the integral mass distribution) in the range of 0.02 to 0.15 micron, II. addition of at least one chemically acting agglomeration agent selected from the group consisting of
 (g) acrylate polymer dispersions and
 (h) polyvinylether dispersions, in such a manner that an average particle size ($d_{50}$-value of the integral mass distribution) of 0.20 to 0.65 micron is obtained, and III. graft polymerization of 20 to 90 percent by weight of at least one monomer selected from the group consisting of styrene, acrylonitrile, methylmethacrylate and mixtures thereof optionally with monomers having a cross-linking action in the presence of 80 to 10 percent by weight of the agglomerated rubber latex of step II relative to the solid material wherein potassium salts of saturated or unsaturated fatty acids having 10 to 30 carbon atoms are used as emulsifier (e).

Manufacture of the Rubber Latex (Step I)

In the basic step a rubber latex is produced in the traditional manner. The basic rubber is defined by its glass temperature which should be less than $-20°$ C., preferably less than $-40°$ C. Useful as the monomer of group (a) are dienes containing 4 to 5 carbon atoms, preferably, butadiene alone. Since butadiene-acrylate rubbers are advantageous for some applications, monomer mixtures of butadiene and acrylates of group (b) may also be used. These preferably contain between 30 and 70 percent by weight of acrylate relative to the mixture. As monomers of group (b), acrylates are preferably used which are derived from alcohols having 1 carbon atom to 8 carbon atoms such as ethyl acrylate, butyl acrylate or ethyl hexyl acrylate. These acrylates can be used together with up to 10 percent by weight of commonly used cross-linking bifunctional monomers (d). The weather-resistant ASA polymers are produced from these mixtures together with (a) or (b) up to 30 percent by weight of comonomers (c) may in each case be present during the polymerization if appropriate. The comonomers (c) include isoprene, styrene, acrylonitrile or vinyl ether.

As is normally done, the polymerization is carried out at temperatures between 30° C. and 90° C. in the presence of potassium salts of long chained fatty acids having 10 carbon atoms to 30 carbon atoms, preferably 12 carbon toms to 20 carbon atoms, as emulsifiers (e). Examples include potassium laurate, potassium palmitate, potassium oleate, potassium stearate or their mixtures. Preferred is potassium oleate. The emulsifiers are used in quantities of 0.3 to 5, preferably 0.5 to 2.0, percent by weight relative to the monomers. The normally applied buffer salts such as sodium bicarbonate and sodium pyrophosphate are also used.

Also used are the commonly applied initiators (f) such as persulfates or organic peroxides with reduction agents as well as molecular weight regulators such as mercaptans, terpinoles or dimeric α-methyl styrene which are added at the beginning or during the polymerization. The weight ratio of water to monomers preferably lies between 2:1 and 1:1. The polymerization is continued until more than 90 percent, preferably more than 96 percent, of the monomers are polymerized. This degree of conversion is generally reached after 4 to 20 hours. The resultant rubber latex has a particle size of 0.02 to 0.3 micron, preferably 0.02 to 0.15 micron, more preferably 0.02 to 0.10 micron. By using methods with which the expert is familiar (for instance, seed operation), medium particle sizes of up to 0.2 or 0.3 micron can also be achieved. The referenced measures refer to the $d_{50}$-value of the integral mass distribution which can be determined, for instance, with the aid of an ultra centrifuge or by counting from electron microscopies. The particle size distribution of such rubber latices is relatively narrow so that one may almost speak of a mono-disperse system.

Agglomeration (Step II)

In the second stage, the rubber latex is agglomerated by addition of at least one chemically acting agglomeration agent selected from the group consisting of (g) and (h), preferably agglomerated by way of polymer dispersions [(g)(h)]. This is implemented, for instance, by adding a dispersion of an acrylate polymer (g) or of polyvinyl ethers (h) according to German Application No. 11 15 462. Preferably used are dispersions of copolymers of acrylates of alcohols having 1 carbon atom to 4 carbon atoms, more preferably ethyl acrylate, containing 0.1 to 10 percent by weight of water soluble polymer-forming monomers such as acrylic acid, methacrylic acid, acrylamide or methacrylamide, N-methylol methacrylate or N-vinyl pyrrolidone. More preferably used is a copolymer of 96 percent ethyl acrylate and 4 percent methacrylamide. The agglomerization dispersion can possibly also contain several of the referenced acrylate polymers.

The concentration of the preferably used acrylate polymers in the dispersion is between 3 and 40 percent by weight. For the agglomeration 0.2 to 20, preferably 1 to 5, parts by weight of the agglomeration dispersion are used per 100 parts of the rubber latex, in each case relative to solids. The agglomeration is carried out by adding the agglomeration dispersion to the rubber. The rate of addition is normally non-critical. Generally it requires approximately 1 to 30 minutes at a temperature between 20° C. and 90° C., preferably between 30° C. and 75° C.

Under the above-mentioned conditions, only part of the rubber particles is agglomerated so that a bimodale or wide distribution results. Following the agglomeration, generally more than 50, preferably between 75 and 95, percent of the particles (numerical distribution) are present in a non-agglomerated state. The average diameter of the rubber particles ($d_{50}$-value of the integral mass distribution) lies between 0.1 and 0.65 micron, preferably 0.2 to 0.65 micron, more preferably between 0.20 and 0.40 micron. The resultant agglomerated rubber latex is relatively stable so that it can be stored and transported without incurring coagulation.

After the agglomeration, up to 2.5 percent by weight relative to the solids component of a potassium salt of a long chained carboxlic acid may be added to the agglomerated latex as emulsifier.

Graft Polymerization (Step III)

The next step is the graft polymerization. This is carried out in aqueous emulsion under the normal above-mentioned conditions. 20 to 90 parts by weight of styrene, acrylonitrile, methylmethacrylate or mixtures of two or all three of these monomers are polymerized in the presence of 80 to 10 parts by weight of the agglomerated rubber latex of step II relative to the solids. The graft polymerization may also be carried out by using monomers with cross-linking effects. Preferably between 25 and 45 percent by weight of a mixture of styrene and acrylontrile in a weight ratio of 88:12 to 65:35 are grafted to 75 to 55 percent by weight of the agglomerated rubber latex of step II relative to the solids. With a very low ratio of monomers to rubber, nearly all monomers are chemically bonded to the basic rubber as side chains. If the ratio becomes greater than approximately 50:50, a considerable part of the monomers will polymerize separately.

In a preferred version where only few monomers are grafted, a graft polymer results which itself still has rubber-like properties. In the following, this graft polymer is referred to as flexible component. If may be precipitated from the dispersion according to familiar methods, for instance, by adding electrolytes and can then be separated and dried.

The copolymerized graft polymer mixtures produced in accordance with this invention are preferably used for the manufacture of mixtures with polymers and/or copolymers.

These polymers or copolymers are referred to as rigid component. Flexible phase and rigid component will result in the familiar ABS and/or ASA molding materials.

However, rigid and flexible components in dispersion may be mixed to precipitate and process them. Also the dispersion of the flexible component may be dewatered only partially and incorporated as moist crumbs into a melt of the rigid component as described in German Application No. 2,037,784.

The rigid component required for mixing with the copolymerized graft polymer mixture may be a polymer of styrene, α-methyl styrene, methyl methacrylate, acrylonitrile, methacrylonitrile, vinyl chloride or of mixtures of two or more of these monomers. A copolymer of 90 to 60 percent by weight of styrene and 10 to 40 percent by weight of acrylonitrile is preferably used for ABS polymers. Upon mixing the weight ratio of rigid component to flexible component may be, for instance, 80:20 and 50:50. The basic rubber content of the finished ABS molding material lies preferably between 5 and 30 percent by weight.

The molding materials obtained by mixing excel in a combination of impact resistance even at low temperatures, surface gloss, flowability and thus thermoplastic processability. The resultant molding materials may contain commonly used additives such as fillers, other plastics, stabilizers, antistatics, plasticizers, flame retardants, lubricants, dyestuffs and pigments, preferably in quantities of a total of 30 percent of their weight. They may be processed into molded parts by extrusion, thermo forming or spray injection.

The parameters used in the examples and comparison tests were determined as follows:

1. The particle size distribution of the ungrafted rubber latex prior to and after the agglomeration was determined by means of an analytical ultra centrifuge corresponding to the method of W. Scholtan and H. Lange, "Kolloid Zeitrift and Zeitung fer Polymere," *Colloid Journal and Polymer Journal*, Vol. 250 (1972), pages 782 to 796. In all cases, the correction of the measured values resulted from the dilution effect in the Mie-effect. In the case of very small latex concentrations of approximately 0.5 to 4 grams per liter, the correction of the concentration effect proved to be unnecessary. The ultra centrifuge measurement provides the integral mass distribution of the latex particle diameter. From this value it can be determined how many weight percent of the latex particle have a diameter equal to or below a certain size. The $d_{50}$-value of the integral mass distribution is defined as that particle diameter at which 50 percent by weight of the latex particles have a smaller diameter than the diameter which corresponds with the $d_{50}$-value. The other 50 percent by weight of the particles have a larger diameter than the $d_{50}$-value. To further characterize the particle size distribution of the rubber latices, the $d_{10}$- and $d_{90}$-values were determined in addition to the $d_{50}$-value. They represent a measure for the distribution wherein the $d_{10}$- and/or $d_{90}$-value of the integral mass distribution is defined corresponding with the $d_{50}$-value but with the difference that it is relative to 10 or 90 percent by weight of the latex particles respectively.

2. After the graft polymerization, the coagulate quantity was determined as follows: the dispersion of the graft polymer is filtered through a screen with a hole diameter of 3 mm. The coarse grained residue is dried under a vacuum of 1 Torr and 80° C. and is then weighed. The parts and percentages referred to in the examples and comparison tests are relative to weight.

EXAMPLE 1

The following products were placed in a V2A steel vessel with paddle agitator designed for a pressure of 10 atmospheres:
 150 parts water
 1.2 parts potassium oleate
 0.3 part potassium persulfate
 0.3 part sodium bicarbonate 0.15 part sodium pyrophosphate In order to remove the oxygen the vessel was purged twice with nitrogen, and the solution under a nitrogen pad was heated to 65° C. 0.5 part of tertiary dodecylmercaptan and 16.6 parts of butadiene were then added to the solution. One hour after the start of the polymerization an additional 83.3 parts of butadiene were metered into the vessel within a period of 5 hours.

Five hours after completion of the butadiene addition, that is, after a total of 11 hours, another 0.5 part of tertiary dodecylmercaptan was added. After a total reaction time of 19 hours and a conversion of 96 percent, a polybutadiene emulsion was obtained which had a solids content of 39.2 percent relative to the emulsion. The polybutadiene latex had a glass temperature of approximately −80° C. At 65° C., 255 parts of the polybutadiene emulsion were diluted with 74 parts of water. For the agglomeration of the latex, 30 parts of an aqueous dispersion of an ethyl acrylate copolymer were metered in, containing 96 percent by weight of ethyl acrylate and 4 percent by weight of methacrylamide in polymerized form. The solids content of this dispersion was 10 percent by weight relative to the dispersion.

The polybutadiene emulsion obtained in this manner was heated to 70° C., and, at this temperature, was mixed with 0.13 part of potassium persulfate (in form of a 3 percent aqueous solution), 0.02 part of tertiary dodecylmercaptane and 11 parts of a mixture of styrene and acrylonitrile. The weight ratio of styrene to acrylonitrile in this mixture was 7:3. Ten minutes after the start of the grafting reaction a mixture of an additional 39 parts of styrene, 17 parts of acrylonitrile and 0.1 part of tertiary dodecylmercaptan were metered in within a period of 2¾ hours. During this process a reaction temperature of 75° C. resulted. After completing the addition of the monomers, the reaction was continued for 1 hour. After cooling the dispersion to 30° C. to 40° C., the material was drained via a screen. The coagulate quantity was 0.4 part. The resultant graft polymer was then precipitated at 95° C. by way of a calcium chloride solution and was filtered. Using an extruder the moist crumbs of the grafted polybutadiene were worked into the melt of a styrene-acrylonitrile copolymer containing 65 percent by weight of styrene and 35 percent by weight of acrylonitrile in polymerized form.

EXAMPLE 2

4.5 Parts of vinyl methyl ether, 9.5 parts of butyl ester of acrylic acid and 6.5 parts of butadiene in 150 parts of water were heated to 65° C. while being stirred and while adding 1.2 parts of potassium oleate, 0.3 part potassium persulfate, 0.3 part sodium bicarbonate and 0.15 part of sodium pyrophosphate. After the polymerization reaction started, a mixture of an additional 47.5 parts of butylester of acrylic acid and 32 parts of butadiene was added within a period of 5 hours. After completing the monomer addition, the polymerization reaction was continued at 65° C. for another 2 hours and the emulsion was then cooled. The solids content of the emulsion was 38.4 percent. The resultant rubber latex had a glass temperature of approximately −55° C. and a narrow particle size distribution which is characterized by the following values:
 $d_{10}$-value: 0.070 micron
 $d_{50}$-value: 0.090 micron
 $d_{90}$-value: 0.115 micron At a temperature of 23° C., and while the mixture was being stirred, 2.9 parts of an aqueous dispersion of an ethyl acrylate copolymer containing 96 percent by weight of ethyl acrylate and 4 percent by weight of methacrylamide in polymerized form were added to 25 parts of this emulsion. The solids content of this agglomerating dispersion was 10 percent by weight. The agglomeration was completed after 1 hour. The partially agglomerated rubber latex showed a wide particle size distribution with slightly bimodale character with the following characteristic values:

$d_{10}$-value 0.115 micron
$d_{50}$-value: 0.310 micron
$d_{90}$-value: 0.590 micron The resultant emulsion was mixed with 7.5 parts of water and heated to 65° C. Following this, and under nitrogen, 0.019 part of potassium persulfate (as a 3 percent aqueous solution), 0.006 part of tertiary dodecylmercaptan, 1.1 parts of styrene and 0.5 part of acrylonitrile were added. Fifteen minutes after the start of the graft polymerization a mixture of an additional 3.4 parts of styrene, 1.4 parts of acrylonitrile and 0.019 part of tertiary dodecylmercaptan were metered in within a period of 1.5 hours. After completing the addition of the monomers, the grafting reaction was continued for 1.5 hours. After cooling the dispersion to 30° C. to 40° C., the mixture was drained via a screen. The coagulate quantity was 0.08 part.

The resultant graft polymer was then precipitated by adding calcium chloride solution, was filtered and dried under a vacuum at 60° C. The graft polymer obtained in this manner was mixed in an extruder with a styrene-acrylonitrile copolymer (65:35) at a temperature of 260°C.

EXAMPLE 3 Sixteen parts of butylester of acrylic acid and 0.33 part of dicyclopentadiene acrylate in 150 parts of water were mixed with 1.2 parts of potassium oleate, 0.3 part sodium persulfate, 0.3 part sodium bicarbonate and 0.15 part sodium pyrophosphate and were heated to 60° C. under a nitrogen pad while being stirred. Ten minutes after startup of the polymerization reaction, a mixture of an additional 82 parts of butylester of acrylic acid and 1.67 parts of dicyclopentadiene acrylate were added within a period of 3 hours. One hour prior to completion of the monomer addition, 7.7 parts of an aqueous dispersion of an ethyl acrylate copolymer containing 96 percent by weight of ethyl acrylate and 4 percent by weight of methacrylamide in polymerized form were added to the reaction mixture at one time. The solids content of this agglomeration dispersion was 10 percent by weight. After completing the addition of the monomers, the polymerization was continued at 60° C. for 2 hours. The polymerization process resulted in the formation of a polybutyl acrylate emulsion with a solids content of 39.5 percent. The already partially agglomerated latex had a glass temperature of approximately $-40°$ C. and a bimodale particle size distribution characterized by the following values:

$d_{10}$-value: 0.120 micron
$d_{50}$-value: 0.160 micron
$d_{90}$-value: 0.365 micron One hundred parts of the resultant emulsion were mixed with 39 parts of water and heated to 60° C. Following this, 0.08 part of potassium persulfate (as 3 percent aqueous solution), 0.01 part of lauroyl peroxide, 3 parts of styrene and 1.0 part of acrylonitrile were added under nitrogen. Fifteen minutes after the start of the graft polymerization, a mixture of an additional 16 parts of styrene, 5.5 parts of acrylonitrile and 0.04 part lauroyl peroxide were measured in within a period of 2 hours. After completion of the addition of monomers, the grafting reaction was continued for 2 hours. After cooling the dispersion to 30° C. to 40° C., the mixture was drained via a sieve. The coagulate quantity was 0.4 part.

The resultant graft polymer was then precipitated by way of a calcium chloride solution at 95° C. and was dried.

COMPARISON TESTS

Polymer latices were produced in accordance with Example 1A, 2A and 3A of German Application 24 27 960. After the graft polymerization, 1.2 part of coagulate were found with respect to Example 1A, 0.23 part with Example 2A and 1.3 parts with Example 3A.

The embodiments of the invention in which an exclusive privilege or property is claimed are defined as follows:

1. In a process for the preparation of an impact resistant thermoplastic material comprising:
    (Step I) the aqueous emulsion polymerization at a temperature of between 30° C. and 90° C. of at least one monomer selected from the group consisting of
        (a) conjugated diolefins having 4 to 5 carbon atoms and
        (b) acrylate esters of alcohols having 1 to 8 carbon atoms, and, optionally,
        (c) 0 to 30 weight percent of monomers which copolymerize with (a) or (b), and
        (d) 0 to 10 weight percent of monomers having a cross-linking action, in the presence of
        (e) 0.3 to 5 weight percent based on monomers of an emulsifier, and
        (f) a vinyl polymerization initiator,
    to produce a rubber latex having a solids content of 33 to 50 weight percent and an average particle size ($d_{50}$-value of the integral mass distribution) in the range of 0.02 to 0.15 micron;
    (Step II) agglomeration of the latex of Step I by the addition of a dilute aqueous dispersion of a chemically acting agglomerating agent selected from the group consisting of
        (g) copolymers of $C_1$-$C_4$ alkyl acrylates with 0.1 to 10 weight percent of acrylic or methacrylic acid or amide, and
        (h) polyvinylether,
    wherein the agglomerating agent is used in an amount between 0.2 and 20 weight percent (solids basis) of the rubber polymer at a temperature of 20° C. to 90° C. for a period of time required to increase the average particle size ($d_{50}$-value) to 0.20 to 0.65 micron; and
    (Step III) graft polymerization of the agglomerated rubber latex of Step II with a monomer selected from the group consisting of styrene, acrylonitrile, methyl methacrylate, and mixtures thereof optionally with a non-conjugated diolefinic monomer having a cross-linking action wherein 20 to 90 weight percent of the grafted polymer is derived from the grafting monomer and 80 to 10 weight percent from the agglomerated rubber latex polymer,
    the improvement comprising using as the emulsifier (e), a potassium salt of a saturated or unsaturated carboxylic acid having 10 to 30 carbon atoms.

2. The process of claim 1 wherein in step III, 25 to 45 percent by weight of a mixture of styrene and acrylonitrile in a weight ratio of 88:12 to 65:35 are graft copolymerized to 75 to 55 percent by weight of the agglomerated rubber latex of step II relative to the solids.

3. The process of claim 1 wherein the emulsifier is potassium oleate.

4. The process of claim 1 which additionally comprises step IV mixing as a flexible component the product from step III and a rigid component derived from a monomer polymer selected from the group consisting of styrene, α-methylstyrene, methylmethacrylate, acrylonitrile, methacrylonitrile, vinyl chloride and mixtures thereof in a weight ratio of rigid to flexible component of 80:20 to 50:50.

5. The product made by the process of claim 1.

* * * * *